United States Patent
Saha et al.

(10) Patent No.: US 7,954,221 B2
(45) Date of Patent: Jun. 7, 2011

(54) ELECTROMAGNETIC MECHANICAL PULSE FORMING OF FLUID JOINTS FOR HIGH-PRESSURE APPLICATIONS

(75) Inventors: Pradip K Saha, Kent, WA (US); Don E Norris, Sea Tac, WA (US); Mark E Bice, Algona, WA (US); Vaughn L Brady, Seattle, WA (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 12/124,944

(22) Filed: May 21, 2008

(65) Prior Publication Data

US 2008/0240850 A1 Oct. 2, 2008

Related U.S. Application Data

(62) Division of application No. 10/905,211, filed on Dec. 21, 2004, now abandoned.

(51) Int. Cl.
*B21D 39/00* (2006.01)
*B21D 26/14* (2006.01)
*B23P 17/00* (2006.01)

(52) U.S. Cl. ............ 29/419.2; 29/508; 29/515; 29/516; 29/525.13; 29/525.15; 72/56; 403/282; 285/382

(58) Field of Classification Search .................. 29/419.2, 29/508, 515, 516, 517, 525.13, 525.15; 72/54, 72/56; 285/382, 256, 247; 403/274, 279, 403/282
See application file for complete search history.

(56) References Cited

U.S. PATENT DOCUMENTS

| | | | |
|---|---|---|---|
| 2,687,904 A | 8/1954 | Thronblom | |
| 2,782,060 A | 2/1957 | Appleton | |
| 2,976,907 A | 3/1961 | Harvey et al. | |
| 3,210,842 A | 10/1965 | Schwinghamer | |
| 3,252,313 A * | 5/1966 | Eilers et al. ................ | 72/56 |
| 3,313,536 A | 4/1967 | Eilers et al. | |
| 3,391,558 A | 7/1968 | Deeg | |
| 3,610,007 A | 10/1971 | Wildi | |
| 3,618,350 A | 11/1971 | Larrimer, Jr. et al. | |
| 3,654,787 A | 4/1972 | Brower | |
| 3,674,586 A | 7/1972 | Rimkus | |
| 3,703,958 A | 11/1972 | Kolm | |
| 3,837,755 A | 9/1974 | Benoit et al. | |
| 3,961,739 A | 6/1976 | Leftheris | |
| 3,998,081 A | 12/1976 | Hansen | |
| 4,143,532 A | 3/1979 | Khimenko et al. | |
| 4,170,887 A | 10/1979 | Baranov | |
| 4,214,358 A | 7/1980 | Clerc | |

(Continued)

OTHER PUBLICATIONS

Edward G. Hoffman, "Production methods", in AccessScience@McGraw-Hill, http://www.accessscience.com, DOI 10.1036/1097-8542.547200, last modified: Aug. 15, 2002.*

(Continued)

*Primary Examiner* — Jermie E Cozart
(74) *Attorney, Agent, or Firm* — Ostrager Chong Flaherty & Broitman P.C.

(57) ABSTRACT

An electromagnetically formed fluid circuit joint (150) includes a tubular conduit (58) that has an outer surface (154) with a groove (72). A hollow fitting (56) is mechanically separate from and received over the tubular conduit (58). The hollow fitting (56) includes an electromagnetic field formed wall deformation (165) that extends into the groove (72).

14 Claims, 4 Drawing Sheets

U.S. PATENT DOCUMENTS

| | | | |
|---|---|---|---|
| 4,504,714 A | 3/1985 | Katzenstein | |
| 4,525,098 A | 6/1985 | Krude et al. | |
| 4,531,393 A | 7/1985 | Weir | |
| 4,702,543 A | 10/1987 | Hager | |
| 4,768,275 A | 9/1988 | Schmitz | |
| 4,807,351 A | 2/1989 | Berg et al. | |
| 5,242,199 A | 9/1993 | Hann et al. | |
| 5,322,205 A | 6/1994 | Kato et al. | |
| 5,353,617 A | 10/1994 | Cherian et al. | |
| 5,442,846 A * | 8/1995 | Snaper | 29/419.2 |
| 5,549,335 A | 8/1996 | Wohrstein | |
| 5,586,460 A | 12/1996 | Steingroever | |
| 5,824,998 A | 10/1998 | Livshiz et al. | |
| 5,826,320 A | 10/1998 | Rahtke et al. | |
| 5,836,070 A | 11/1998 | Arena | |
| 5,953,805 A | 9/1999 | Steingrover | |
| 5,964,127 A | 10/1999 | Steingrover | |
| 5,981,921 A * | 11/1999 | Yablochnikov | 219/603 |
| 5,983,478 A | 11/1999 | Dolan et al. | |
| 5,992,898 A | 11/1999 | Saylor | |
| 6,065,317 A | 5/2000 | Steingrover | |
| 6,229,125 B1 | 5/2001 | Livshiz | |
| 6,452,139 B1 | 9/2002 | Benoit et al. | |
| 6,619,701 B1 | 9/2003 | Udhofer | |
| 6,630,649 B1 | 10/2003 | Gafri et al. | |
| 6,875,964 B2 | 4/2005 | Golovaschenko et al. | |
| 6,990,840 B2 * | 1/2006 | Park | 72/56 |
| 7,015,435 B2 | 3/2006 | Yablochnikov | |
| 2003/0209536 A1 | 11/2003 | Golovaschenko et al. | |
| 2005/0097934 A1 * | 5/2005 | Park | 72/56 |
| 2006/0208481 A1 | 9/2006 | Fischer et al. | |

OTHER PUBLICATIONS

E. Diehl, et al., Long Precision Drift Tube Production at Michigan, Dept. of Physics University of Michigan, May 2002.

Peihui Zhang, M.S., Joining Enabled By High Velocity Deformation, Dissertation, Ohio State University, 2003.

* cited by examiner

ELECTROMAGNETIC MECHANICAL PULSE FORMING OF FLUID JOINTS FOR HIGH-PRESSURE APPLICATIONS

RELATED APPLICATION

The present invention is a divisional application of U.S. patent application Ser. No. 10/905,211 filed on Dec. 21, 2004 of the same title is now abandoned, the entire content of which is hereby incorporated by reference and which is related to U.S. patent application Ser. No. 11/028,093 entitled "Electromagnetic Mechanical Pulse Forming of Fluid Joints for Low-Pressure Applications" now abandoned, U.S. patent application Ser. No. 10/905,331 entitled "Magnetic Field Concentrator for Electromagnetic Forming and Magnetic Pulse Welding of Fluid Joints" now U.S. Pat. No. 7,513,025 B2, and U.S. patent application Ser. No. 10/905,233 entitled "Electromagnetic Pulse Welding of Fluid Joints," is now abandoned, which are incorporated by reference herein.

TECHNICAL FIELD

The present invention generally relates to the solid state coupling of metallic tubes and fittings. More specifically, the present invention is related to the mechanical magnetic coupling of the tubes to the fittings.

BACKGROUND ART

Metallic tubes are commonly used to carry fluid in the form of gas or fluid throughout various fluid circuits in many industries. This is especially true in the aerospace industry, due to the lightweight and strong mechanical features of the metallic tubes. For example, thin-walled aluminum and stainless steel tubing is often utilized within an aircraft to carry oxygen and hydraulic fluid for various applications, such as to breathing apparatuses and to and from vehicle brakes.

The fluid circuits typically contain a vast number of interlock joints, which reside between the tubing and the end fittings, such as fittings. The current technique used to join the different sized tubes and fittings, is referred to as a roller swaging process. During this process, a tube is inserted into a fitting while the fitting is constrained using a clamp. The tube is then expanded into the fitting using a roller. The inner walls of the fitting typically contain grooves within which the tube is expanded. An interlock is created between the tube and the fitting due to the expansion and deformation of the tube against the inner walls and into the grooves of the fitting.

Another technique that is commonly used to join metallic tubes to end fittings is referred to as Gas Tungsten Arc Welding (GTAW), which is a fusion welding process. The formed joints produced from fusion welding are sometimes rejected by penetrant inspection or by radiographic inspection and must be weld repaired. A weld formed joint may need to be repaired as many as three times, at significant costs.

A desire exists to increase the operating lifetime of a mechanical or fluid tight joint. Thus, there exists a need for an improved leak tight joint between a tube and a fitting and a technique for forming the leak tight joint that may be applied to various fluid circuit applications. It is desirable that the improved technique be economical, have an associated quick production set-up time, and account for different sized tube and fitting combinations.

SUMMARY OF THE INVENTION

The present invention satisfies the above-stated desires and provides a leak tight joint for high-pressure applications utilizing magnetic interactions.

One embodiment of the present invention provides an electromagnetically formed fluid circuit joint that includes a tubular conduit with an outer surface. The outer surface has a groove. A hollow fitting is mechanically separate from and received over the tubular conduit. The hollow fitting includes an electromagnetic field formed wall deformation that extends into the groove.

The embodiments of the present invention provide several advantages. One such advantage is the provision of electromagnet mechanically joining process for forming a liquid tight joint between a ferrule and a tube. This process is quick and economical.

Another advantage provided by an embodiment of the present invention, is the provision of a tube having one or more grooves for deformation therein by a ferrule wall. The deformation within the grooves provides a leak tight joint.

Furthermore, the present invention provides joint forming techniques with improved repeatability, with quick assembly times, that do not require lubrication to form, and that have low associated scrap rates. The scrap rates, as a result of the joint forming techniques, is approximately zero.

Other features, benefits and advantages of the present invention will become apparent from the following description of the invention, when viewed in accordance with the attached drawings and appended claims.

DETAILED DESCRIPTION

Figure 1:
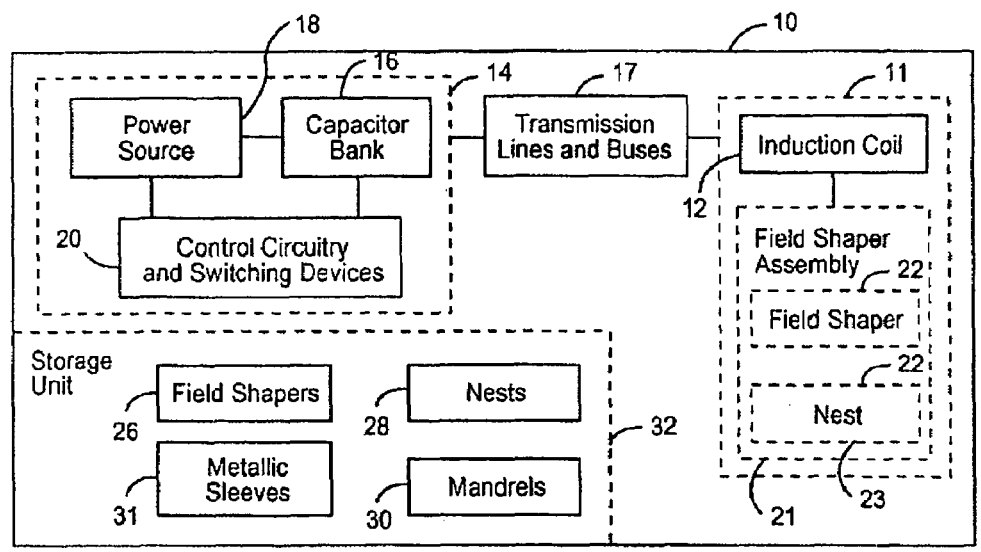
FIG. 1 is a block diagrammatic view of a magnetic forming system in accordance with an embodiment of the present invention.

In each of the following Figures, the same reference numerals are used to refer to the same components. While the present invention is described with respect to a system for electromagnetically forming a fluid joint and to the joints formed therefrom, the present invention may be adapted for various applications, such as air, gas, liquid, and fluid applications. The present invention may be applied to high-pressure fluid applications of equal or greater than approximately 5000 psi. The present invention may be applied to fluid applications in the aerospace, automotive, railway, and nautical or watercraft industries.

The present invention allows for the electromagnetic formation of fluid tight joints between fittings and tubular conduits having various diameters. The present invention may be applied to applications where the fittings and the tubular conduits have outer diameters of greater than approximately two inches, as well as to applications where the outer diameters are less than or equal to approximately two inches.

In the following description, various operating parameters and components are described for one constructed embodiment. These specific parameters and components are included as examples and are not meant to be limiting.

Also, in the following description the term "fitting" may refer to a ferrule, a nut, a union, or other fitting known in the art. A fitting may be magnetically formed or magnetically welded to or with a tubular conduit, as is described below.

Referring now to FIG. 1, a block diagrammatic view of a magnetic forming system 10 in accordance with an embodiment of the present invention is shown. The magnetic forming system 10 includes an induction coil and field shaper assembly 11 with an induction coil 12 that is utilized to magnetically form a fluid joint between fluid carrying tubes and fittings, some examples of fluid joints, fluid carrying tubes, and fittings are shown in FIGS. 2A-6.

In operation, the induction coil 12 receives current generated from a current supply circuit 14 and generates an electromagnetic field, which is utilized to mechanically form and/or weld portions of a tube and a corresponding fitting to form a fluid joint. The current supply circuit 14 may include a capacitor bank 16 and a power source 18, as shown. Control circuitry and switching devices 20 is coupled to the capacitor bank 16, via transmission lines and buses 17, and controls charge and discharge thereof via the power source 18. The induction coil 12 is coupled to a field shaper 22, which focuses the electrical current within the induction coil 12. Prior to forming a fluid joint, various field shapers 26, nests 28, mandrels 30, and metallic sleeves 31 within a storage unit 32 may be selected that correspond to a particular tube and fitting combination. The selected field shaper and nest are inserted into the induction coil 12 prior to electromagnetic forming of a tube and/or a fitting.

The control circuitry may include switches for the setting of various power levels. The control circuitry may be in various forms known in the art and is used to control the power received by the capacitor bank 16 and transmitted to the induction coil 12.

The field shaper 22 is used to adapt a compression coil, such as the induction coil 12, to a smaller diameter workpiece, having a smaller diameter than the induction coil. The field shaper 22 concentrates the magnetically exerted pressure to a specific location on a tube, a fitting, and/or a metallic sleeve. When the capacitor bank 16 is discharged through the induction coil 12, the induced current in the magnetic field produces a magnetic pressure on the conductive tube, fitting, and/or metallic sleeve. The amount of discharged power produces a sufficient amount of magnetic compressive or expansive pressure to conform and deform the tube, fitting, and/or metallic sleeve.

The metallic sleeves 31 are utilized to improve the electromagnetic field effect on and to increase the deformation of, for example, a fitting during electromagnetic deformation. When a fitting is utilized that is formed of a high tensile material that has low electrical conductivity, such as titanium, a metallic sleeve may be utilized to aid in the deformation of the fitting. The metallic sleeves may be formed of stainless steel or copper. In one example embodiment, a copper sleeve having 99.5% purity is utilized.

Figure 2A:
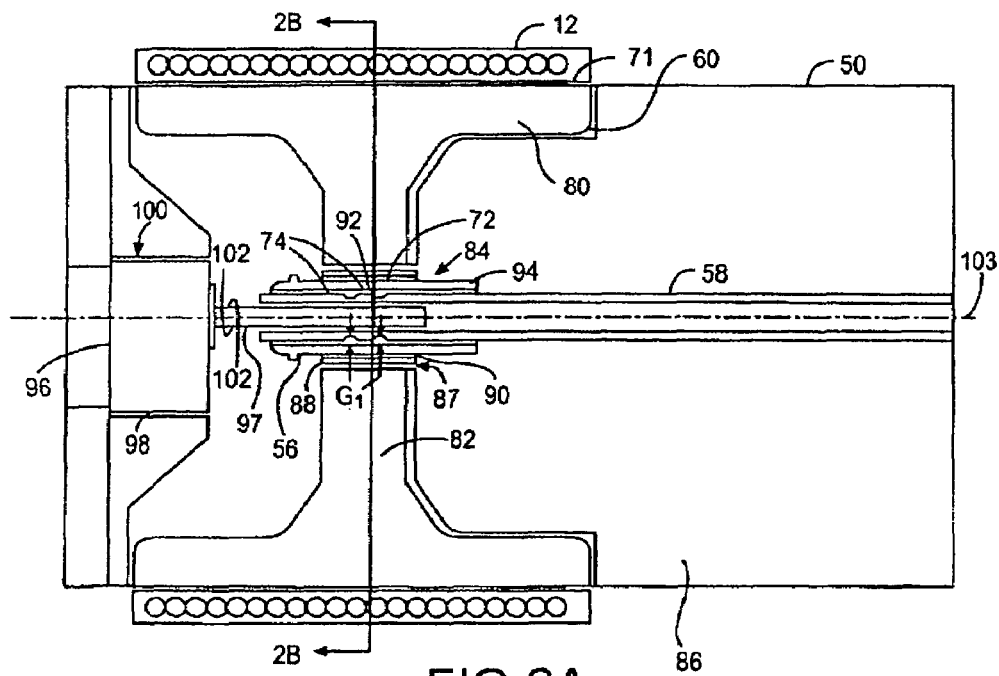
FIG. 2A is a cross-sectional side view of a field shaper/nest that may be incorporated into the system of FIG. 1 in accordance with an embodiment of the present invention.
Figure 2B:
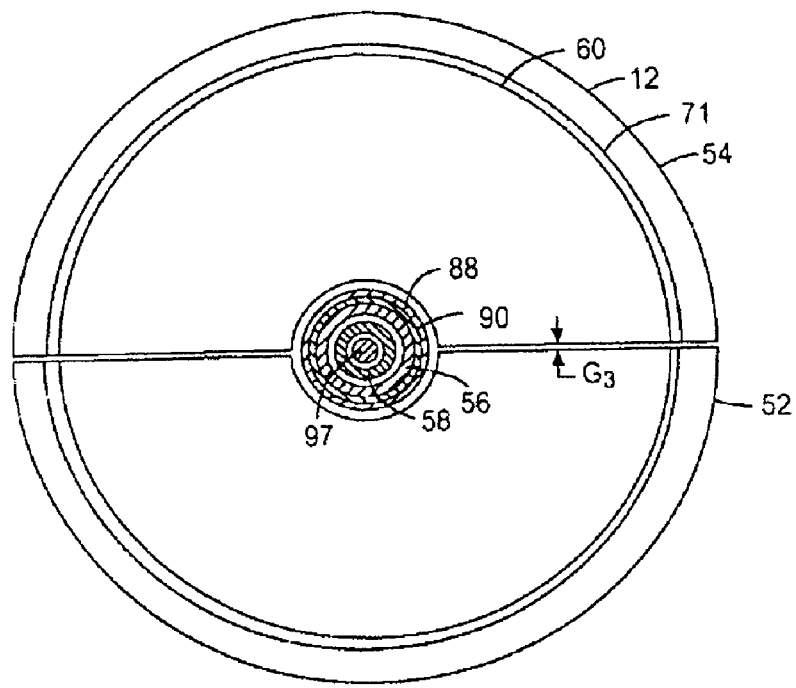
FIG. 2B is a front cross-sectional view of the field shaper/nest of FIG. 2A.
Figure 2C:
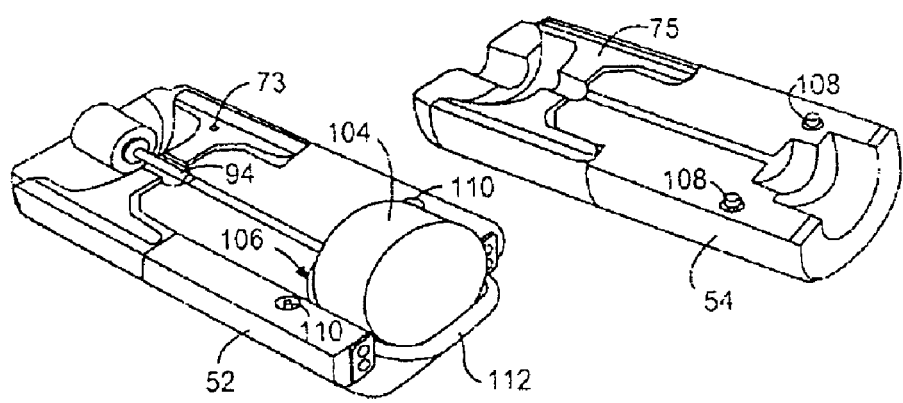
FIG. 2C is a perspective view of the two halves of the field shaper/nest of FIG. 2A.
Figure 3:
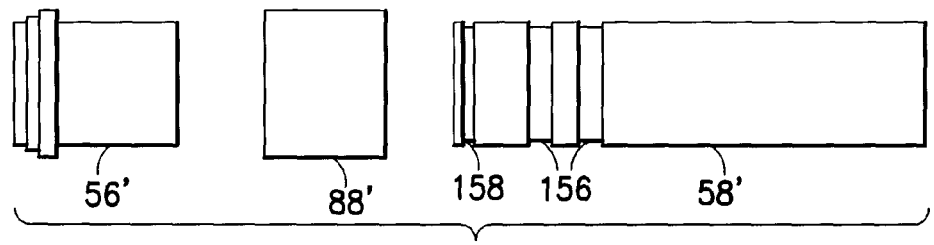
FIG. 3 is a perspective view of a fitting, a metallic sleeve, and a tube utilized to form a fluid tight joint in accordance with an embodiment of the present invention.
Figure 4:
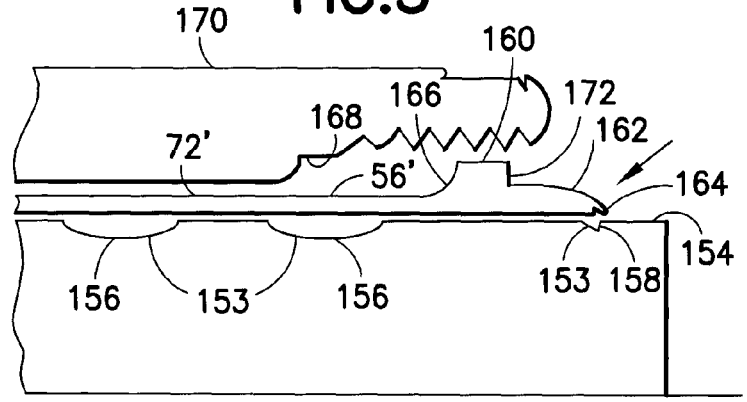
FIG. 4 is a half-side cross-sectional view of a tube and fitting coupling prior to electromagnetic forming in accordance with yet another embodiment of the present invention.
Figure 5:
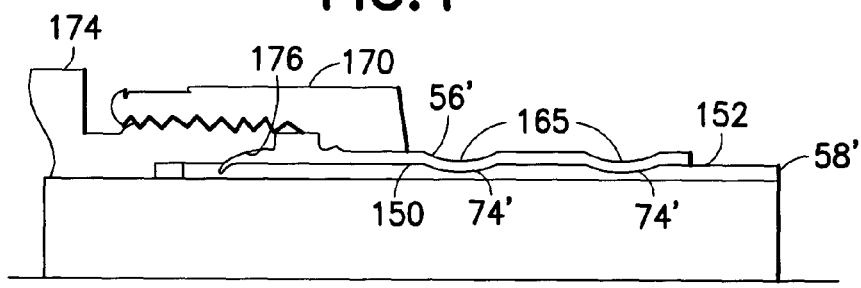
FIG. 5 is a half-side cross-sectional view of the tube/fitting coupling of FIG. 4 as attached to a corresponding union subsequent to electromagnetic forming in accordance with yet another embodiment of the present invention.
Figure 6:
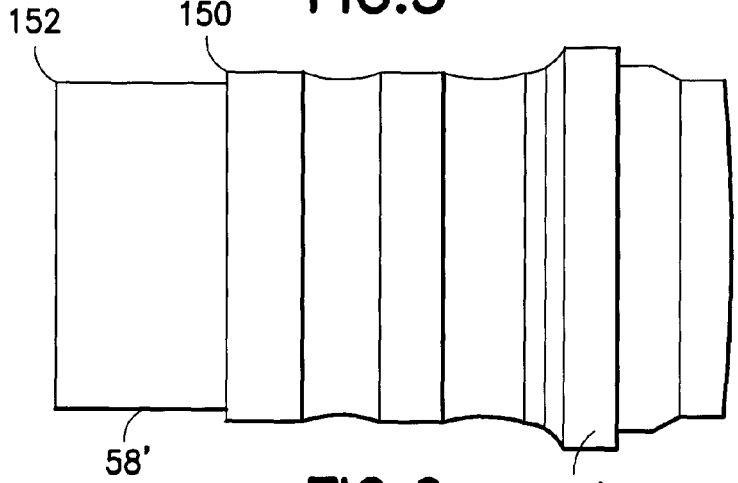
FIG. 6 is a side view of the tube and fitting coupling of FIG. 4 after forming.

The below described embodiment of FIGS. 2A-C, is a sample embodiment that may be utilized in the electromagnetic forming of the walls of a fitting to form a fluid tight joint. Other similar embodiments may be utilized.

Referring now to FIGS. 2A-C, a cross-sectional side view of an field shaper/nest assembly 50, a front cross-sectional view of the field shaper/nest assembly 50, and a perspective view of the two halves 52 and 54 of the field shaper/nest assembly 50 are shown in accordance with an embodiment of the present invention. The field shaper/nest assembly 50 is used to compress a fitting 56 onto a tube 58 via an electromagnetic field generated by the induction coil 12 and the field shaper 60. Tube and fitting features are described with respect to the sample embodiment of FIGS. 3-6 below.

The field shaper/nest assembly 50 utilizes the field shaper 60, which may be one of the field shapers 26, to form a fluid tight joint. The field shaper/nest assembly 50 includes the first half 52 and the second half 54, which is a mirror image of the first half 52. The field shaper 60 is put into the induction coil 12. An insulation layer 71 resides between the induction coil 12 and the field shaper 60 and is used to prevent short circuiting between the induction coil 12 and the field shaper 60. The induction coil 12 generates an electromagnetic field, which is imposed on the fitting 56 via the field shaper 60. The electromagnetic field accelerates the tube-forming portion 72 of the fitting 56 toward the tube 58, thereby compressing the tube-forming portion 72 within the grooves 74 of the tube 58.

The field shaper 60 is generally cylindrically shaped and is utilized to generate an electromagnetic field to cause the deformation of the fitting 56 to form a fluid joint. The cross-section of the field shaper 60 is "I"-shaped. The field shaper 60 includes a first shaper half 73 and a second shaper half 75. The combined halves 73 and 75 form an outer ring 80 and a main center disc 82 that extends inward toward a tube/fitting forming region 84. The center disc 82 has a semi-circular opening 87 in the tube/fitting forming region 84. The field shaper halves 73 and 75 are, respectively, connected and have internal dimensions and geometry that correspond with the nest halves 52 and 54. The field shaper 60 is held fixed in place within the nest 86 during electromagnetic forming.

When the fitting 56 is formed of stainless steel, titanium, or other material having similar conductivity and tensile characteristics, a metallic sleeve 88 may be used to increase deformation of the fitting. The metallic sleeve 88 is oriented to reside over the tube-forming portion 72 and aids in the formation thereof. The metallic sleeve 88 reacts to and is formed by the electromagnetic field induced by the field shaper 60 causing the tube-forming portion 72 to be compressed and formed at least partially into the grooves 74. The metallic sleeve 88 allows for increased deformation in the tube-forming region by improving field effects thereon. The metallic sleeve 88 may be formed of high purity copper or other highly conductive material. In one embodiment, the metallic sleeve is formed of at least approximately 99.5% pure copper.

In addition, a second insulation layer 90 may be utilized between the tube-forming portion 72 and the metallic sleeve 88. The insulation layer 90 provides a layer of protection during removal of the metallic sleeve 88 from the fitting 56 after electromagnetic forming. This is explained in further detail below with respect to the method of FIG. 7.

Fly distance gaps $G_1$ reside between the fitting 56 and the tube 58, which allow for the acceleration of the fitting material in the tube-forming portion 72 to compress and be accelerated towards the grooves of the tube 58. A gap $G_3$ may also reside between the shaper halves 73 and 75.

The field shaper 60 and the nest 86 are split to provide ease in set-up and disassembling of the field shaper/nest assembly

50. The field shaper 60 may be formed of beryllium copper BeCu or other material having similar properties. The nest 86 may be of various sizes, shapes, and styles, and may be formed of various non-metallic materials. In one embodiment, the nest 86 is formed of plastic. The nest 86 holds the fitting 56 and the tube 58 in alignment.

The fitting 56 and the tube 58 may be formed of various metallic materials, such as aluminum, stainless steel, and titanium. The tube 58 includes the grooves 74, in a fitting inlay section 92, in which the wall 94 of the fitting 56 is deformed therein. This deformation into the grooves 74 provides a non-sealant based fluid tight seal. Although a non-sealant based fluid tight seal may be formed as suggested, sealants known in the art may be utilized, for example, an adhesive may be utilized between the fitting 56 and the tube 58.

A mandrel 96 may be used to limit the inward lateral displacement of the fitting 56 and the tube 58. A mandrel 96 resides within the nest 86 and includes an insert portion or stem 97, which is inserted into the tube 58 through the tube/fitting forming region 84. The stem 97 may be slightly tapered, although not shown, and is inserted within the tube 58. The outer edges 102 of the stem 97, when tapered, are tapered inward towards the centerline 103 away from the handle portion 98. The stem 97 is coupled to a handle portion 98, which resides in a recessed portion 100 of the nest 86.

A plug 104 may be located within a second recessed portion 106 of the nest 86 and prevent lateral displacement of the tube 58. The nest 86 may include alignment tabs 108 on, for example, the second half 54, and corresponding receivers 110, on the first half 52. The tabs 108 and the receivers 110 ease the alignment and coupling of the first half 52 to the second half 54. A carry handle 112 is shown and may be coupled to the nest 86 for easy inserting and removing from the induction coil 12, and easy carrying and transporting thereof.

Referring now to FIGS. 3-6, a perspective view of a fitting 56', a metallic sleeve 88', and a tube 58' utilized to form a fluid tight joint 150, half-side cross-sectional views prior and subsequent to electromagnetic forming, and a side view are shown of a tube/fitting coupling 152 in accordance with yet another embodiment of the present invention. The tube/fitting joint 150 is capable of withstanding internal fluid pressures of greater than 5000 psi when formed from high tensile strength materials, such as stainless steel and titanium.

The tube/fitting coupling 152 includes the tube 58' having multiple grooves 153 on an exterior surface 154 and the fitting 56' for formation thereon. The tube 56' includes electromagnetic forming grooves 156 and a fitting end groove 158. The fitting 56' includes a tube-forming portion 72', a nut step 160, and a curved end 162 with a tip 164. The tube-forming portion 72', during electromagnetic forming, is deformed such that a portion or section thereof is bent into the electromagnetic grooves 153. This bent section may be referred to as an electromagnetic field formed wall deformation. Two such sections 165 are shown. The nut step 160 includes an arched side 166, for abutting an interior side 168 of a nut 170, and a linear side 172, for abutting a union 174. The curved end 162 corresponds with an interior side 176 of the union 174 to allow for a continuous contact area between the curved end 162 and the union 174. This continuous contact area aids in providing a leak free joint and increases the rated pressure of the tube/fitting joint 150. The tip 164 may be bent or formed such that it is placed within the fitting end groove 158.

The fitting 56' and the tube 58' may be formed of similar materials as mentioned above. The tube 58' may have any number of electromagnetic forming grooves. The grooves may be of various widths and have various associated separation distances therebetween.

The groove geometry and the placement of the grooves 153 on the outer surface 154, the radius of curvature of the front end 162, and other geometry of the fitting 56' and the tube 58' enhances strength of the fluid joint 150 between the fitting 56' and the tube 58' after applying an initial torque of approximately 1200 in-lb on the nut 170. The grooves 156 are circular in shape to prevent cracking within the tube-forming portion 72'.

In order for the tube 58" to have the electromagnetic forming grooves 156 and withstand the electromagnetic forming process and in-process fluid pressures of 5000 psi or greater, the tube 58" is a "thick-walled" tube. The term "thick-walled" refers to a tube in which the ratio between the outer diameter and the inner diameter of the tube is approximately greater than 1.2. The tube-forming portion 72' also provides support and absorbs a significant portion of the stresses experienced in the material around and near the electromagnetic forming grooves 156.

Figure 7:
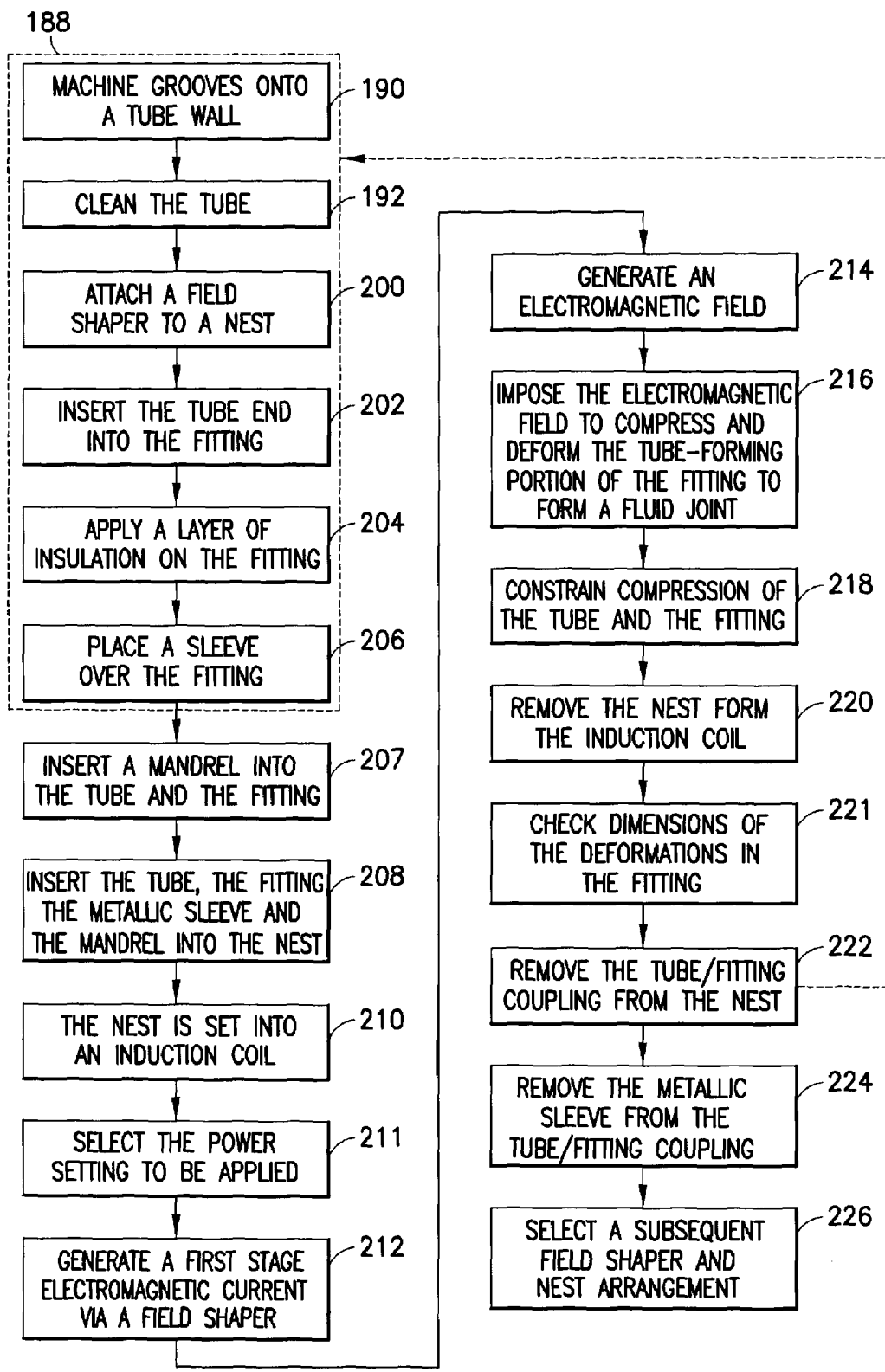
FIG. 7 is a sample method of magnetically forming a fluid joint in accordance with an embodiment of the present invention.

In the method of FIG. 7, the material compositions of the tubes and the fittings utilized can affect the ability of the tubes and or the fittings to be deformed. As an example, when it is desired for a fitting to be deformed as opposed to a tube, the material composition of the fitting may be adjusted and/or have less tensile strength than that of the tube to allow for such deformation. The thickness of the tube and fitting walls may also be adjusted to provide various degrees of tensile strength. In addition, the electromagnetic current pulses utilized may also be adjusted to provide the desired deformation in the tube and the fitting.

Referring now to FIG. 7, a sample method of magnetically forming a fluid joint, such as the fluid joint 150, in accordance with an embodiment of the present invention is shown.

Dashed box 188 represents the following steps that are included in the tube/fitting preparation phase. In step 190, grooves, such as the grooves 153, are machined within a current tube, such as the tube 58 or the tube 58'. The grooves are machined using techniques known in the art. In step 192, the tube is chemically cleaned to remove any dirt and/or lubricant within or exterior to the tube.

In step 200, a field shaper, such as the field shaper 60, is attached and/or inserted into a nest, such as the nest 86. In step 202, the current tube is inserted into a current fitting, such as the fitting 56 or the fitting 56'. The fitting is placed in the appropriate location on the tube for forming. In step 204, a metallic sleeve, such as the metallic sleeve 88 or the metallic sleeve 88' is placed over the fitting. In step 206, a mandrel, such as the mandrel 96, is inserted into the tube. In step 207, a thin layer of insulation is applied to the exterior of the fitting, such as the insulation layer 90. The insulation layer may be rolled onto the sleeve.

In step 208, the tube, the fitting with the insulation layer, the metallic sleeve, and the mandrel are inserted into a current nest. The tube, the fitting, the metallic sleeve, and the mandrel are placed on a first half of the nest, such as half 52. A second half, such as half 54, of the nest is placed over the first half covering the fitting, the tube, the metallic sleeve, and the mandrel. In step 210, the nest is set into an induction coil, such as the induction coil 12.

In step 211, a power setting is selected and entered into the control circuitry, depending upon the tube/fitting coupling being formed. In step 212, the control circuitry 20 via an induction coil generates a first stage electromagnetic current that is passed into the field shaper via coupling between the induction coil and the field shaper. In step 214, the field shaper focuses the first stage electromagnetic current to form an electromagnetic field.

In step 216, the electromagnetic field is imposed upon the exterior of the metallic sleeve and/or fitting and accelerates and compresses the metallic sleeve and the tube-forming portion of the fitting, such as the tube-forming portion 72', onto the tube. In accelerating and compressing the fitting onto the tube, the tube-forming portion of the fitting is deformed into the grooves of the tube. The compression and deformation of the tube-forming portion forms a pressure tight fluid joint with the tube. The fly distance gaps between the fitting and the tube, such as gaps $G_1$, allow for the acceleration of the tube-forming portion. In step 218, the mandrel constrains or limits the compression of the fitting and the tube during electromagnetic formation. Steps 212-218 are substantially performed simultaneously.

Electrical current from the capacitor bank is passed through the induction coil, which generates an intense electromagnetic field and creates high magnitude eddy currents in the tube end. The opposing magnetic fields that are directly generated by the induction coil and that are generated by the eddy currents accelerate the fitting walls towards the tube.

A high current pulse of short duration, approximately between about 10 and 100 microseconds, is introduced to the coils of the induction coil, which generates the electromagnetic field to instantaneously deform the fitting radially inward towards the tube, resulting in the crimping of the fitting onto the tube to form the fluid joint. The pulse is strong enough to induce magnetic forces above the yield strength of the material in the fitting.

In step 220, upon completion of steps 220-228 the current nest is removed from the induction coil containing the fluid joint. In step 221, deformation of the fitting within the grooves of the tube is checked. When the deformations are of appropriate dimension step 222 is performed and 224 is performed. When the deformations are of inappropriate dimension, for example, the depth of the deformations is smaller than desired step 222 is performed followed by returning to the tube/fitting preparation phase and repeating steps 190-221 to form another tube/fitting coupling with increased deformation depth. To increase deformation depth the power setting selected in step 211 is increased.

In step 222, the tube/fitting coupling including the fluid joint is removed from the current nest. The first half and the second half of the current nest are separated to allow for the removal of the tube/fitting coupling.

In step 224, the metallic sleeve is removed from the tube/fitting coupling. The metallic sleeve may be cut using a rotating end mill and pulled of the tube/fitting coupling using a pair of pliers. Of course, the metallic sleeve may be removed using other techniques known in the art. When an insulation layer, such as the insulation layer 90 is used, the insulation layer aids in protecting the fitting during the cutting and removing of the metallic sleeve.

In step 226, it is determined whether the current setup and configuration of the current tube and the current fitting is to be reused or replaced. Either another tube/fitting coupling is formed using the current field shaper and nest arrangement or a replacement field shaper and nest arrangement is selected. The replacement field shaper and nest may have different internal dimensions as compared with the current field shaper and nest and may be selected from the field shapers 26 and the nests 28. The different internal dimensions may correspond to a tube/fitting coupling of different size, to a tube/fitting coupling having a different tube/fitting configuration, to a tube/fitting coupling formed using a different electromagnetic forming technique, or to other known tube/fitting related differences known in the art. Upon selection of a second or replacement tube, a second or replacement fitting, a replacement field shaper, and a replacement nest, step 200 is performed.

The above-described steps are meant to be an illustrative example; the steps may be performed synchronously, continuously, or in a different order depending upon the application.

The present invention provides fluid tight leak joints with reduced scrap rate. Further, because the insert/nest assemblies are quickly and easily inserted and removed from a fixed structure, a large quantity of tubular joints may be quickly formed. The above stated reduces costs associated with manufacturing down times.

The present invention reduces manufacturing processing steps as compared to conventional welding and roller swaging or elastomeric processes. The present invention also reduces inspection process steps, cost of production, and provides a highly reproducible manufacturing process to maintain consistent quality.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of magnetically forming a fluid joint comprising:
    inserting a first tube having at least one groove therein partially into a first fitting so that said first fitting partially overlaps said first tube;
    applying a layer of insulation onto said first fitting;
    inserting said first fitting in a metallic sleeve such that the insulation layer is disposed between said first fitting and said metallic sleeve;
    providing a magnetic forming system including an induction coil;
    inserting said first tube, said first fitting, and said metallic sleeve into said induction coil;
    generating an electromagnetic field; and
    imposing said electromagnetic field on said metallic sleeve to compress said metallic sleeve and cause said fitting to be compressed and formed at least partially into said at least one groove of said first tube to form a first fluid joint.

2. A method as in claim 1 wherein compressing said metallic sleeve comprises compressing a first portion of said first fitting into said at least one groove.

3. A method as in claim 1 further comprising
    removing a current nest containing said first fluid joint;
    separating a first half and a second half of said current nest;
    removing said metallic sleeve from said first fitting; and
    removing said first fluid joint from said current nest.

4. A method as in claim 3 further comprising:
    selecting a replacement nest;
    inserting a second tube having at least one groove therein and a second fitting within said replacement nest, said second fitting partially over said second tube;
    inserting a replacement nest within said induction coil; and
    imposing said electromagnetic field on and to compress at least a second portion of said second fitting into at least one groove of said second tube to form a second fluid joint.

5. A method according to claim 4 wherein the metallic sleeve is removed prior to removing said first fluid joint.

6. A method as in claim 1 further comprising inserting a mandrel within said first tube and said first fitting and forming said fluid joint over said mandrel.

7. A method as in claim 1, wherein said metal sleeve is formed of high purity copper and said fitting and tube are formed of aluminum, stainless steel or titanium.

8. A method according to claim 1 further comprising utilizing a sealant between said fitting and said tube.

9. A method according to claim 1 wherein said tube is a thick walled tube in which the ratio between the inner diameter and the outer diameter is approximately greater than 1.2.

10. A method according to claim 1 further comprising prior to forming said fluid joint, machining said at least one groove within a current tube and chemically cleaning said tube to remove any dirt and/or lubricant within or exterior to said tube.

11. A method of magnetically forming a fluid joint comprising:
    providing a first tube having at least one groove extending around a circumference thereof and an end groove disposed proximate one end of said first tube;
    providing a first fitting having a tip at one end of said first fitting;
    inserting said first tube partially into a first fitting so that said first fitting partially overlaps said first tube and the tip of said first fitting extends into the end groove of said first tube;
    providing a magnetic forming system including an induction coil;
    inserting said first tube and said first fitting into said induction coil;
    generating an electromagnetic field; and
    imposing said electromagnetic field on said first fitting to compress at least a first portion of said first fitting into at least one groove of said first tube to form a first fluid joint.

12. A method according to claim 11, further comprising applying a layer of insulation onto said first fitting.

13. A method according to claim 12, further comprising inserting said first fitting in a metallic sleeve such that the insulation layer is disposed between said first fitting and said metallic sleeve, and imposing said electromagnetic field on said metallic sleeve to compress said metallic sleeve and cause said fitting to be compressed and formed at least partially into said at least one groove of said first tube.

14. A method as in claim 13, wherein compressing said metallic sleeve comprises compressing said first portion into said at least one groove.

* * * * *